(12) United States Patent
Sato (10) Patent No.: US 6,804,067 B2
(45) Date of Patent: Oct. 12, 2004

(54) SINGLE FOCUS LENS

(75) Inventor: Kenichi Sato, Ageo (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 24 days.

(21) Appl. No.: 10/650,856

(22) Filed: Aug. 29, 2003

(65) Prior Publication Data

US 2004/0061953 A1 Apr. 1, 2004

(30) Foreign Application Priority Data

Sep. 27, 2002 (JP) ........................................ 2002-284000

(51) Int. Cl.$^7$ ............................................... G02B 15/14

(52) U.S. Cl. ..................... 359/784; 359/792; 359/790; 359/689; 359/683

(58) Field of Search ................................. 359/784, 792, 359/790, 680, 797, 787, 682, 716, 754, 689, 683

(56) References Cited

U.S. PATENT DOCUMENTS

| | | | | |
|---|---|---|---|---|
| 4,721,378 A | * | 1/1988 | Volk | 351/205 |
| 5,828,498 A | * | 10/1998 | Sekiya et al. | 359/660 |
| 6,259,570 B1 | * | 7/2001 | Noda | 359/785 |
| 6,441,971 B2 | | 8/2002 | Ning | 359/739 |

FOREIGN PATENT DOCUMENTS

JP 10-048516 2/1998

* cited by examiner

*Primary Examiner*—Tim Thompson
(74) *Attorney, Agent, or Firm*—Arnold International; Jon W. Henry; Bruce Y. Arnold (57) ABSTRACT

A single focus lens is disclosed that is formed of only three lens components. In order from the object side, these are: a first lens component that has positive refractive power and includes a first lens element; an aperture diaphragm; a second lens component that has positive refractive power, at least one aspheric lens surface, and includes a second lens element made of plastic; and a third lens component that has positive refractive power, at least one aspheric lens surface, and includes a third lens element made of plastic. The following condition is satisfied: $1.0 < f_1/f < 5.0$ where $f_1$ is the focal length of the first lens component, and f is the focal length of the single focus lens.

20 Claims, 4 Drawing Sheets

Spherical Aberration
Fig. 4A

Astigmatism
Fig. 4B

Distortion
Fig. 4C

Spherical Aberration
Fig. 5A

Astigmatism
Fig. 5B

Distortion
Fig. 5C

US 6,804,067 B2

SINGLE FOCUS LENS

BACKGROUND OF THE INVENTION

In the past, lens modules for image reading systems mounted in comparatively thin devices, such as simple digital cameras, webcams for PCs, and other handheld devices, have been required to be short and inexpensive rather than capable of high optical performance. In order to satisfy these requirements, imaging lenses have conventionally been formed of a single lens component. In such devices, image pickup devices such as CCDs have been small for receiving a small image and they have been of relatively low resolution. Fewer lens components and lens elements in the imaging lenses of the lens modules has enabled the lens modules to be very small.

Recently, larger image pickup devices with higher resolution have been developed. Large aberrations caused by the use of a single lens component or single lens element lens module have prevented sufficiently improved optical performance from being achieved with these higher resolution and larger image pickup devices. Therefore, it has become necessary to develop an imaging lens that takes advantage of the higher resolution and larger size of recent image pickup devices. This resulted, for example, in a three-component imaging lens being proposed with all the lens components made of plastic and including at least one aspheric lens surface, as described in Japanese Laid-Open Patent Application H10-048516. However, the lens components disclosed in this published Japanese application are not all sufficiently small and inexpensive. Additionally, the optical performance of this imaging lens, particularly with regard to correcting for curvature of field and distortion, is not satisfactory.

Furthermore, for image reading using a PC or a handheld device, a small image pickup device has been used that requires the principal ray to strike the image detecting surface of the image pickup device at an angle of approximately fifteen degrees or less to the surface normal. However, due to recent improvements in image pickup devices, it has become acceptable for the principal ray to strike the image detecting surface at a larger angle of incidence, for example, approximately twenty-five degrees or greater. Therefore, an imaging lens where various aberrations can be excellently corrected even if the principal ray strikes the detecting surface at larger angles of incidence is desired.

BRIEF SUMMARY OF THE INVENTION

The present invention is a single focus lens formed of three lens components that is advantageously used with recently improved image pickup devices as in, for example, small digital cameras, image reading devices connected to PCs, and other handheld devices. The single focus lens is compact and of inexpensive construction, and achieves a high optical performance, with particularly excellent correction of curvature of field and distortion.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

First, definitions of the terms "lens element" and "lens component" that relate to the following detailed description will be given. The term "lens element" is herein defined as a single transparent mass of refractive material having two opposed refracting surfaces, which surfaces are positioned at least generally transversely of the optical axis of the lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component."

Figure 1:
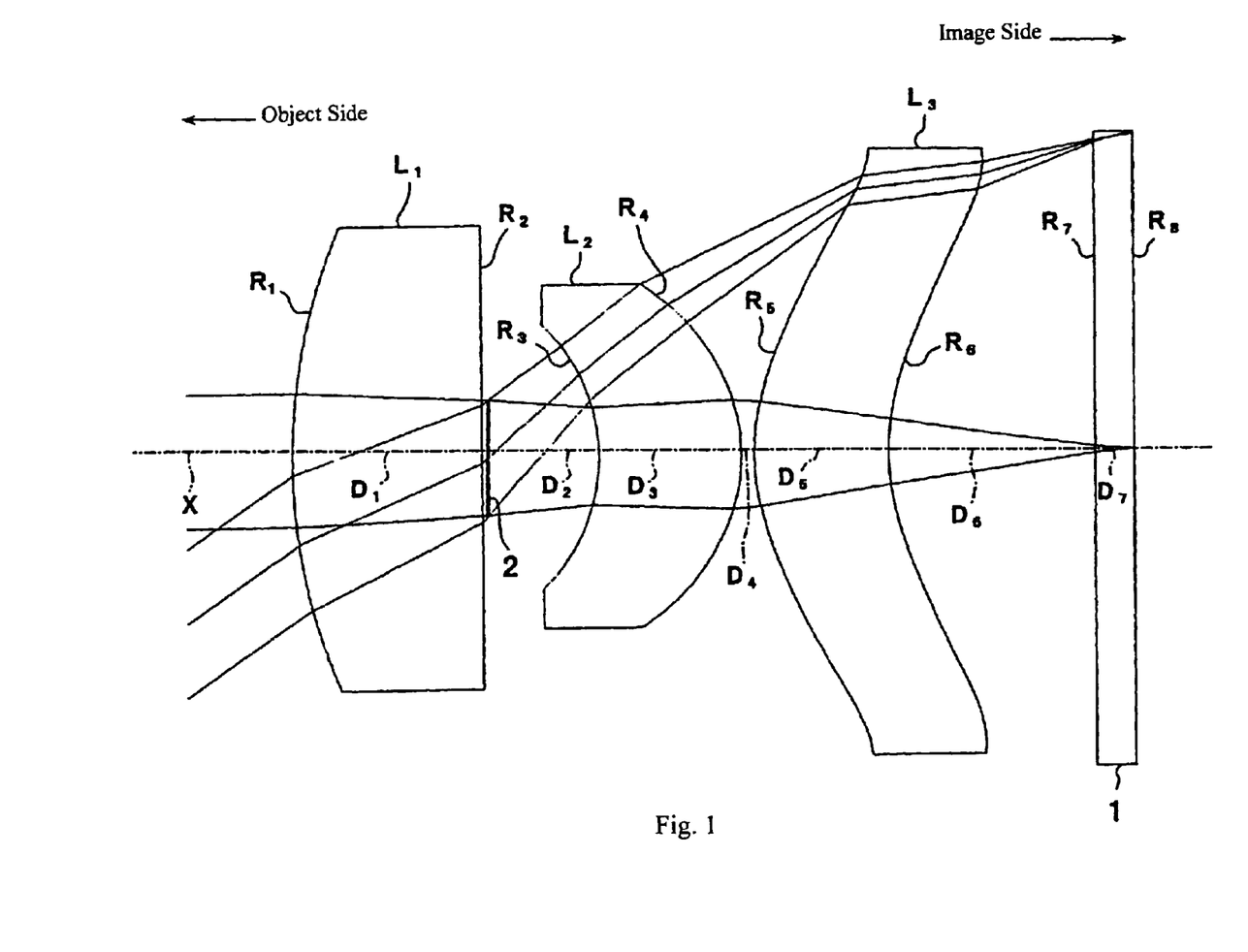
FIG. 1 shows a cross-sectional view of a single focus lens according to the present invention.

A general description of the preferred embodiments of the three-component, single focus lens of the present invention will now be described with reference to FIG. 1. FIG. 1 shows a cross-sectional view of a single focus lens according to the present invention that specifically includes three lens elements. In FIG. 1, the lens elements are referenced by the symbols $L_1$, $L_2$, and $L_3$ in order from the object side of the single focus lens. Similarly, the radii of curvature of the refractive optical elements are referenced by the letter R followed by a subscript denoting their order from the object side of the single focus lens, from $R_1$ to $R_8$. The on-axis surface spacings (along the optical axis X of the figures) of all the optical surfaces are referenced by the letter D with a subscript denoting their order from the object side of the single focus lens, from $D_1$ to $D_7$. The object side and the image side of the single focus lens are indicated by labeled directional arrows at the upper left and upper right, respectively, of FIG. 1.

In accordance with the definitions of "lens component," and "lens element" above, in the two preferred embodiments of the single focus lens of the present invention described below, lens elements $L_1$, $L_2$, and $L_3$ are also lens components. Thus, the present invention may variously be described in terms of lens elements or in terms of lens components. For simplicity of explanation, the following descriptions of the present invention refer generally to lens elements. However, these descriptions apply more generally also to lens components for which the lens elements are examples. Additionally, when the lens components may include more than one lens element, lens elements as well as the lens components may satisfy the following descriptions, as appropriate.

As shown in FIG. 1, the first lens element $L_1$ has positive refractive power and is a plano-convex lens with its convex surface on the object side. The second lens element $L_2$ has positive refractive power and a meniscus shape with its convex lens surface on the image side. The third lens element $L_3$ has positive refractive power near the optical axis and a meniscus shape with its concave lens surface on the image side. At least one lens surface of each of the second lens element $L_2$ and the third lens element $L_3$ has an aspheric shape. Preferably, both lens surfaces of both of the second and third lens elements, $L_2$ and $L_3$, are aspheric lens surfaces. Additionally, both the second lens element $L_2$ and the third lens element $L_3$ are made of plastic. By making lens elements with aspheric lens surfaces of plastic, the aspheric lens elements may be easily and inexpensively manufactured and the improved optical performance associated with the use of aspheric lens surfaces can be achieved. By using such aspheric surfaces, a very inexpensively constructed imaging lens of relatively high optical performance can be made.

Additionally, by all three lens components having positive refractive power, the overall length of the single focus lens can be reduced, and the aberrations of curvature of field and distortion can be reduced. Furthermore, the single focus lens of the present invention provides a greater angle of incidence of the principal ray onto the image plane of an image pickup device in accordance with recent improvements in image pickup devices. This allows the image pickup device to be nearer the exit surface of the single focus lens, which in the present invention is the exit surface of the third lens component. This, in turn, allows the entire imaging device, including the single focus lens and the image pickup device, to be thinner.

Figure 2:
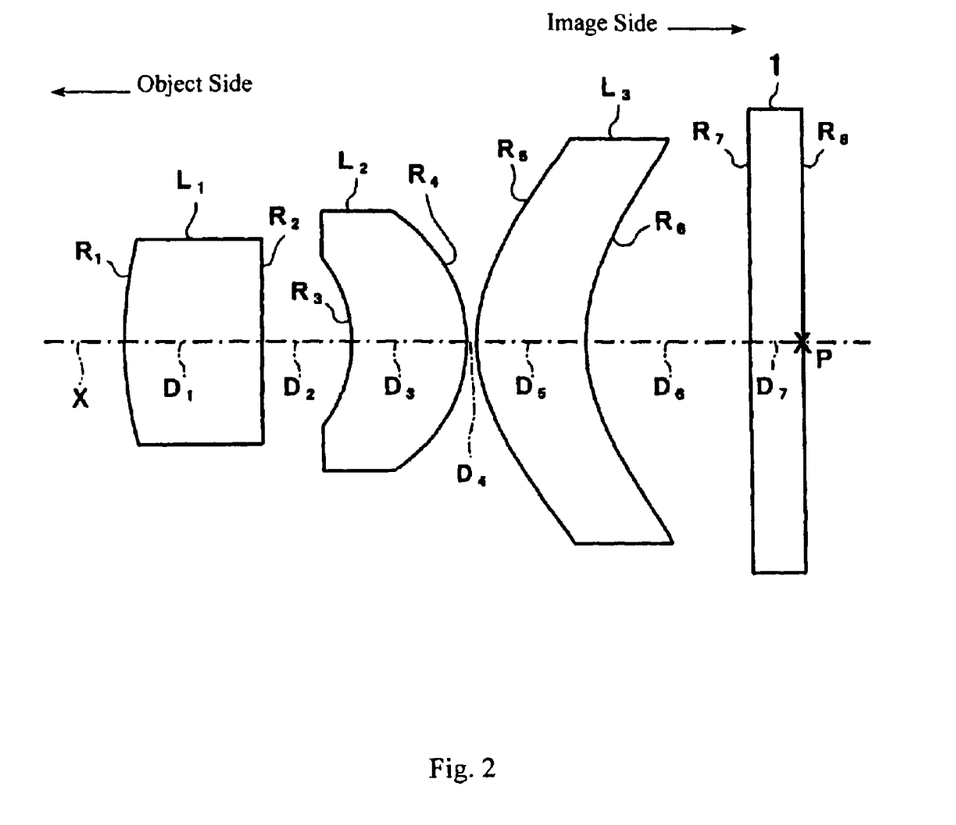
FIG. 2 shows a cross-sectional view of the single focus lens according to Embodiment 1.
Figure 3:
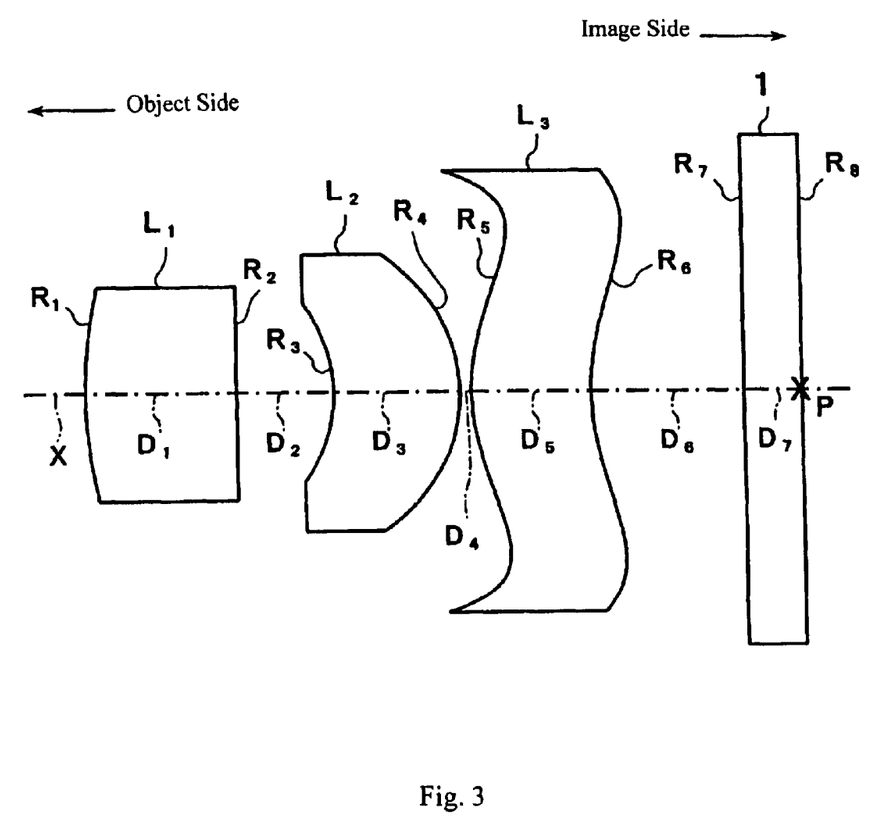
FIG. 3 shows a cross-sectional view of the single focus lens according to Embodiment 2.

As shown in FIG. 1, an aperture diaphragm 2 that operates as an aperture stop is arranged between the first lens element $L_1$ and the second lens element $L_2$. A cover glass 1 is positioned on the image side of the third lens element $L_3$ with one surface located at the image plane where the image detecting surface of an image pickup element (not shown) may be located. As shown by ray tracings in FIG. 1, the single focus lens is designed so that a collimated light beam that enters the lens along the optical axis X is efficiently converged to a point on an image plane of an image pickup device (not shown) that is located at the image-side surface of the cover glass. FIGS. 2 and 3 show this image point as the point P on the optical axis X.

The second lens element $L_2$ is designed with an aspheric lens surface on the image side, and the positive refractive power of this aspheric lens surface increases as the distance Y from the optical axis X increases. The third lens element is designed with an aspheric lens surface on the object side, and the positive refractive power of this aspheric lens surface decreases as the distance Y from the optical axis X increases.

The lens surfaces that are aspheric are defined by the following equation:

$$Z=[(CY^2)/\{1+(1-K \cdot C^2 \cdot Y^2)^{1/2}\}]A_4Y^4+A_6Y^6+A_8Y^8+A_{10}Y^{10} \quad \text{Equation (A)}$$

where

Z is the length (in mm) of a line drawn from a point on the aspheric lens surface at a distance Y from the optical axis to the tangential plane of the aspheric surface vertex, C is the curvature (=1/the radius of curvature, R) of the aspheric lens surface on the optical axis, Y is the distance (in mm) from the optical axis, K is the eccentricity, and $A_n$ is the nth aspheric coefficient.

Further, preferably the following condition is satisfied:

$$1.0 < f_1/f < 5.0 \quad \text{Condition (1)}$$

where $f_1$ is the focal length of the first lens element $L_1$, and f is the focal length of the single focus lens.

Condition (1) controls the ratio of the focal length f of the first lens element $L_1$ to the focal length of the single focus lens. If the ratio is larger than the upper limit of Condition (1), correction of curvature of field becomes difficult. If the ratio is smaller than the lower limit of Condition (1), the distance to an exit pupil becomes excessively short, which is undesirable. By satisfying Condition (1), curvature of field can be excellently corrected and an adequate distance to the exit pupil can be achieved.

Additionally, preferably the following condition is satisfied:

$$50 > v_1 \quad \text{Condition (2)}$$

where $v_1$ is the Abbe number of the first lens element $L_1$ (at the d-line of $\lambda=587.6$ nm).

If Condition (2) is not satisfied, it is difficult to correct chromatic aberration of the single focus lens.

Two preferred embodiments of the single focus lens of the present invention will now be described with reference to FIGS. 2 and 3. The same notations used above are used below to describe Embodiments 1 and 2 of the present invention, which are shown in FIGS. 2 and 3, respectively. Embodiments 1 and 2 are similar to one another and both are in accordance with the above general description of the present invention. Therefore, a general description of Embodiments 1 and 2 will not be repeated below.

Embodiment 1

FIG. 2 shows a cross-sectional view of the basic lens element configuration of the single focus lens of Embodiment 1. Although not shown in FIG. 2, Embodiment 1 has an aperture diaphragm between the first lens element $L_1$ and the second lens element $L_2$ as previously described with reference to FIG. 1.

Table 1 below lists the surface number #, in order from the object side, the radius of curvature R (in mm) of each surface near the optical axis, the on-axis surface spacing D (in mm), as well as the refractive index $N_d$ and the Abbe number $v_d$ (both at the d-line, $\lambda=587.6$ nm) of each optical element for Embodiment 1. Listed in the bottom portion of Table 1 are the focal length f, the f-number $F_{NO}$, and the maximum image angle $2\omega$.

TABLE 1

| # | R | D | $N_d$ | $v_d$ |
|---|---|---|---|---|
| 1 | 4.3062 | 1.30 | 1.68893 | 31.1 |
| 2 | ∞ | 0.85 | | |
| 3* | −1.2540 | 1.10 | 1.49020 | 57.5 |
| 4* | −1.4500 | 0.10 | | |
| 5* | 1.5033 | 1.05 | 1.49020 | 57.5 |
| 6* | 1.8025 | 1.56 | | |
| 7 | ∞ | 0.50 | 1.51680 | 64.2 |
| 8 | ∞ | | | |
| | f = 3.59 mm | $F_{NO}$ = 3.5 | | $2\omega = 64.4°$ |

The surfaces with a * to the right of the surface number in Table 1 are aspheric lens surfaces, and the aspheric surface shape is expressed by Equation (A) above.

Table 2 below lists the values of the constants K, $A_4$, $A_6$, $A_8$, and $A_{10}$ used in Equation (A) above for each of the aspheric lens surfaces of Table 1. Aspheric coefficients that are not present in Table 2 are zero. An "E" in the data indicates that the number following the "E" is the exponent to the base 10. For example, "1.0E-2" represents the number $1.0 \times 10^{-2}$.

as well as the refractive index $N_d$ (at the d-line of $\lambda$=587.6 nm) and the Abbe number $\nu_d$ (at the d-line of $\lambda$=587.6 nm) of each optical element for Embodiment 2. Listed in the bottom portion of Table 3 are the focal length f, the f-number $F_{NO}$, and the maximum image angle 2ω.

TABLE 2

| # | K | $A_4$ | $A_6$ | $A_8$ | $A_{10}$ |
|---|---|---|---|---|---|
| 3 | -2.7802 | 1.4974E-1 | -1.1590E-2 | -1.3037E-2 | 8.8731E-5 |
| 4 | 9.3404E-1 | -3.2637E-2 | 2.4875E-2 | -8.7377E-3 | 2.4213E-3 |
| 5 | -3.1139 | 4.0233E-2 | -1.4737E-2 | 3.4665E-3 | -3.9192E-4 |
| 6 | 1.7205E-1 | -2.3273E-2 | 1.3381E-4 | 9.8710E-4 | -2.3275E-4 |

Embodiment 1 satisfies Condition (1) with a value of $f_1/f$ equal to 1.74, with $f_1$ being equal to 6.25 mm. Embodiment 1 also satisfies Condition (2) with the value of $\nu_1$ being equal to 31.1.

Figure 4A:
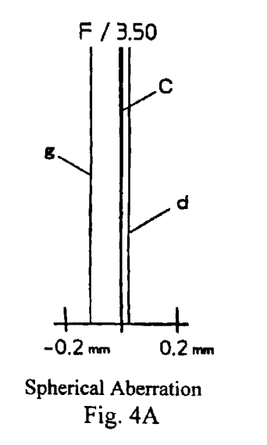
FIGS. 4A–4C show the spherical aberration, astigmatism, and distortion, respectively, of the single focus lens according to Embodiment 1.
Figure 4B:
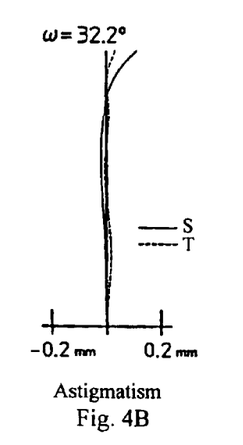
Figure 4C:
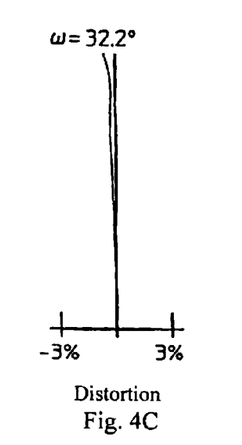

FIGS. 4A–4C show the spherical aberration, astigmatism, and distortion, respectively, of the single focus lens according to Embodiment 1. In FIG. 4A, the spherical aberration is shown for the d-line ($\lambda$=587.6 nm), the g-line ($\lambda$=435.8 nm), and the C-line ($\lambda$=656.3 nm). As shown in FIG. 4A, the f-number is 3.5. In FIG. 4B, the astigmatism is shown at the d-line ($\lambda$=587.6 nm) for both the sagittal image surface S and the tangential image surface T. In FIG. 4C, the distortion is shown at the d-line ($\lambda$=587.6 nm). The half-image angle ω for FIGS. 4B and 4C is 32.2°.

As is clear from the lens data and aberration curves discussed above, in Embodiment 1 the various aberrations are favorably corrected.

Embodiment 2

FIG. 3 shows a cross-sectional view of the basic lens element configuration of the single focus lens of Embodiment 2. Although not shown in FIG. 3, Embodiment 2 has an aperture diaphragm between the first lens element $L_1$ and the second lens element $L_2$ as previously described with reference to FIG. 1.

Table 3 below lists the surface number #, in order from the object side, the radius of curvature R (in mm) of each surface near the optical axis, the on-axis surface spacing D (in mm),

TABLE 3

| # | R | D | $N_d$ | $\nu_d$ |
|---|---|---|---|---|
| 1 | 4.3062 | 1.30 | 1.84666 | 23.9 |
| 2 | ∞ | 0.85 | | |
| 3* | -1.2582 | 1.10 | 1.49020 | 57.5 |
| 4* | -1.4500 | 0.10 | | |
| 5* | 1.7601 | 1.05 | 1.49020 | 57.5 |
| 6* | 2.1392 | 1.33 | | |
| 7 | ∞ | 0.50 | 1.51680 | 64.2 |
| 8 | ∞ | | | |
| | f = 3.61 mm | $F_{NO}$ = 3.5 | 2ω = 62.9° | |

The surfaces with a * to the right of the surface number in Table 3 are aspheric lens surfaces, and the aspheric surface shape is expressed by Equation (A) above.

Table 4 below lists the values of the constants K, $A_4$, $A_6$, $A_8$, and $A_{10}$ used in Equation (A) above for each of the aspheric lens surfaces of Table 3. Aspheric coefficients that are not present in Table 4 are zero. An "E" in the data indicates that the number following the "E" is the exponent to the base 10. For example, "1.0E-2" represents the number $1.0 \times 10^{-2}$.

TABLE 4

| # | K | $A_4$ | $A_6$ | $A_8$ | $A_{10}$ |
|---|---|---|---|---|---|
| 3 | -2.6226 | -1.3996E-1 | -9.4869E-3 | -1.2856E-2 | 9.5261E-5 |
| 4 | 9.2544E-1 | -2.9794E-2 | 2.2019E-2 | -9.0574E-3 | 2.6547E-3 |
| 5 | -4.9375 | 1.8519E-2 | -1.9904E-2 | 3.5493E-3 | -9.0872E-4 |
| 6 | -1.6449 | -2.5980E-2 | 9.5365E-4 | -2.6259E-3 | 3.4476E-4 |

Embodiment 2 satisfies Condition (1) with a value of $f_1/f$ equal to 1.41, with $f_1$ being equal to 5.09 mm. Embodiment 2 also satisfies Condition (2) with the value of $v_1$ being equal to 23.9.

Figure 5A:
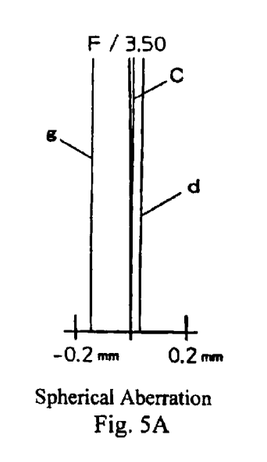
FIGS. 5A–5C show the spherical aberration, astigmatism, and distortion, respectively, of the single focus lens according to Embodiment 2.
Figure 5B:
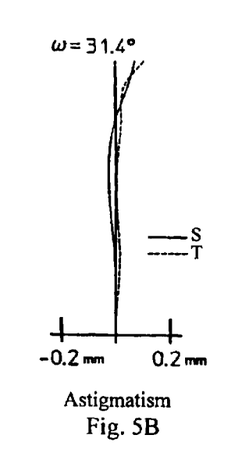
Figure 5C:
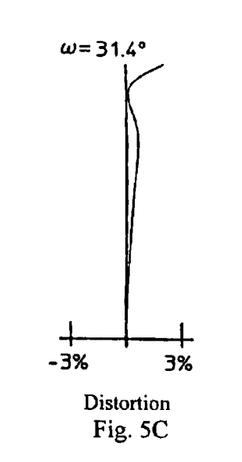

FIGS. 5A–5C show the spherical aberration, astigmatism, and distortion, respectively, of the single focus lens according to Embodiment 2. In FIG. 5A, the spherical aberration is shown for the d-line ($\lambda$=587.6 nm), the g-line ($\lambda$=435.8 nm), and the C-line ($\lambda$=656.3 nm). As shown in FIG. 5A, the f-number is 3.5. In FIG. 5B, the astigmatism is shown at the d-line ($\lambda$=587.6 nm) for both the sagittal image surface S and the tangential image surface T. In FIG. 5C, the distortion is shown at the d-line ($\lambda$=587.6 nm). The half-image angle $\omega$ for FIGS. 5B and 5C is 31.4°.

As is clear from the lens data and aberration curves discussed above, in Embodiment 2 the various aberrations are favorably corrected.

The invention being thus described, it will be obvious that the same may be varied in many ways. For instance, values such as the radius of curvature R of each of the lens elements and components, the surface spacings D, the refractive index $N_d$, as well as the Abbe number $v_d$, are not limited to the examples indicated in each of the aforementioned embodiments, as other values can be adopted. Additionally, the shape of the aspheric lens surfaces may be varied. Also, lens elements that act as lens components may variously be modified as lens components that include more than one lens element. For example, one or more of the lens elements that includes an aspheric lens surface may be formed as a thin plastic lens element with one aspheric lens surface and one spherical lens surface that is bonded to a spherical surface of a lens element of a different lens material, such as glass, to form a lens component that includes two lens elements. Additionally, a single lens component may include a plurality of glass and/or plastic lens elements. If a single lens component includes a plurality of lens elements, these lens elements may be glass lens elements and plastic lens elements, or all the lens elements of the lens component may be made of either glass or plastic. Thus, descriptions of imaging lenses of the present invention above may be expressed with reference to lens components and/or lens elements, as appropriate. For example, Condition (1) above may be expressed with reference to a first lens component or to a lens element of the first lens component, as appropriate. Although Condition (2) above refers specifically to a lens element, that lens element may also be a lens component, as described above, or may be any one of a plurality of lens elements forming the first lens component. Furthermore, the invention may be used with digital cameras, personal computers, and a variety of handheld devices. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A single focus lens that is formed of only three lens components, in order from the object side, as follows:
    a first lens component that has positive refractive power and includes a first lens element;
    an aperture diaphragm;
    a second lens component that has positive refractive power, that has at least one aspheric lens surface, and that includes a second lens element made of plastic; and
    a third lens component that has positive refractive power, that has at least one aspheric lens surface, and that includes a third lens element made of plastic;

wherein the following conditions are satisfied:

$$1.0 < f_1/f < 5.0$$

$$50 > v_1$$

where
   $f_1$ is the focal length of said first lens component,
   f is the focal length of the single focus lens, and
   $v_1$ is the Abbe number of said first lens element at the d-line of 587.6 nm.

2. The single focus lens of claim 1, wherein said first lens component consists of said first lens element.

3. The single focus lens of claim 1, wherein said second lens component consists of said second lens element.

4. The single focus lens of claim 2, wherein said second lens component consists of said second lens element.

5. The single focus lens of claim 1, wherein said third lens component consists of said third lens element.

6. The single focus lens of claim 2, wherein said third lens component consists of said third lens element.

7. The single focus lens of claim 3, wherein said third lens component consists of said third lens element.

8. The single focus lens of claim 4, wherein said third lens component consists of said third lens element.

9. The single focus lens of claim 1, wherein:
    said first lens component is made of glass and its object-side lens surface is convex;
    the object-side lens surface of said second lens component is concave;
    the image-side lens surface of said second lens component is an aspheric lens surface having positive refractive power and the positive refractive power of said image-side lens surface of said second lens component increases as the distance from the optical axis of the single focus lens increases;
    the object-side lens surface of said third lens component is convex; and
    the object-side lens surface of said third lens component is aspheric and the positive refractive power this lens surface decreases as the distance from the optical axis of the single focus lens increases.

10. The single focus lens of claim 9, wherein said first lens component consists of said first lens element.

11. The single focus lens of claim 9, wherein said second lens component consists of said second lens element.

12. The single focus lens of claim 10, wherein said second lens component consists of said second lens element.

13. The single focus lens of claim 9, wherein said third lens component consists of said third lens element.

14. The single focus lens of claim 10, wherein said third lens component consists of said third lens element.

15. The single focus lens of claim 11, wherein said third lens component consists of said third lens element.

16. A single focus lens that is formed of only three lens components, in order from the object side, as follows:
    a first lens component that has positive refractive power and includes a first lens element;
    an aperture diaphragm;
    a second lens component that has positive refractive power, that has at least one aspheric lens surface, and that includes a second lens element made of plastic; and
    a third lens component that has positive refractive power, that has at least one aspheric lens surface, and that includes a third lens element made of plastic;

wherein the following conditions are satisfied:

$$1.0 < f_1/f < 5.0$$

where $f_1$ is the focal length of said first lens component, and f is the focal length of the single focus lens.

17. The single focus lens of claim 16, wherein said first lens component consists of said first lens element.

18. The single focus lens of claim 16, wherein said second lens component consists of said second lens element.

19. The single focus lens of claim 17, wherein said second lens component consists of said second lens element.

20. The single focus lens of claim 16, wherein said third lens component consists of said third lens element.

* * * * *

UNITED STATES PATENT AND TRADEMARK OFFICE
CERTIFICATE OF CORRECTION

PATENT NO. : 6,804,067 B2
DATED : October 12, 2004
INVENTOR(S) : Sato

It is certified that error appears in the above-identified patent and that said Letters Patent is hereby corrected as shown below:

Column 5,
Table 2, first row, column $A_4$, insert a minus sign -- - -- before the number "1.4974E-1".

Signed and Sealed this

Fifteenth Day of February, 2005

JON W. DUDAS
*Director of the United States Patent and Trademark Office*